Oct. 9, 1956  J. GAUCI  2,765,815
APPARATUS FOR ASSEMBLING COIL SPRINGS INTO UNITS
Filed Feb. 14, 1951  6 Sheets-Sheet 2

INVENTOR
JOSEPH GAUCI

BY *Semmes, Keegin, Robinson & Semmes*
ATTORNEYS

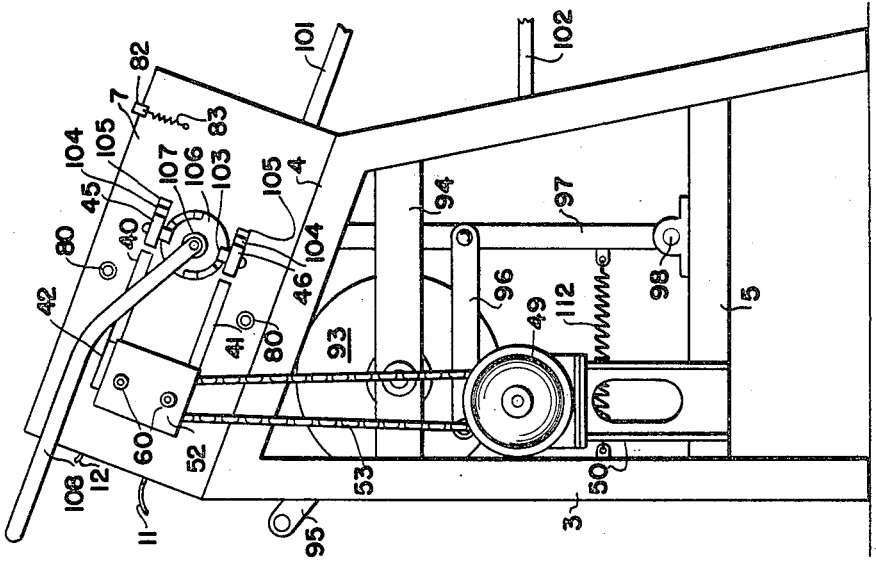
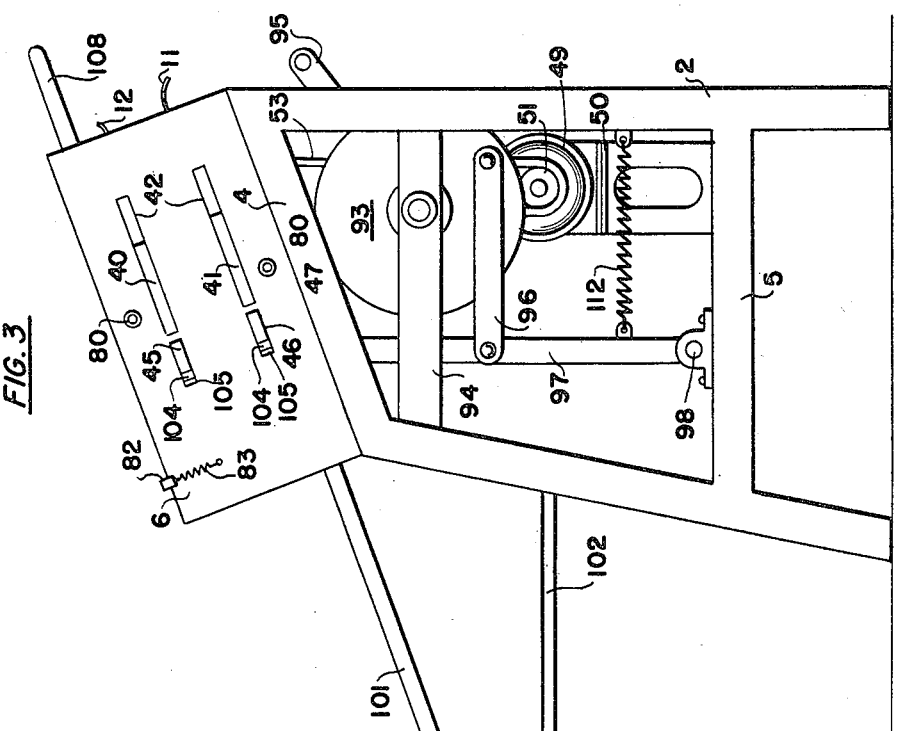

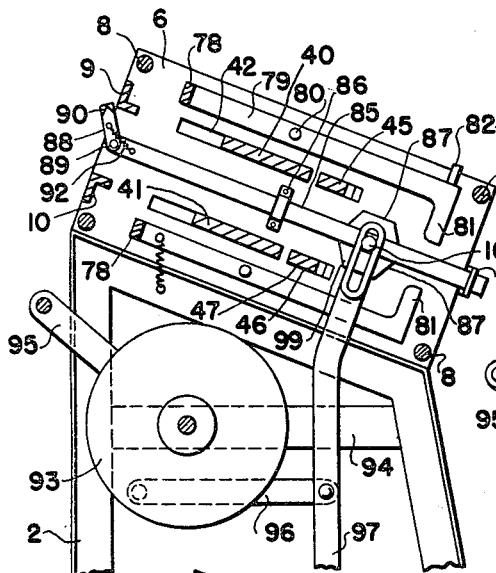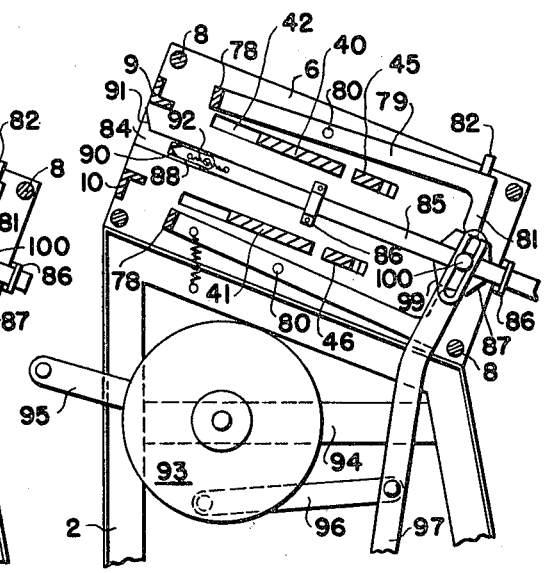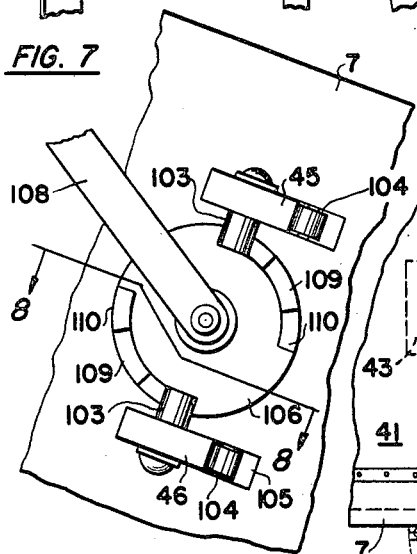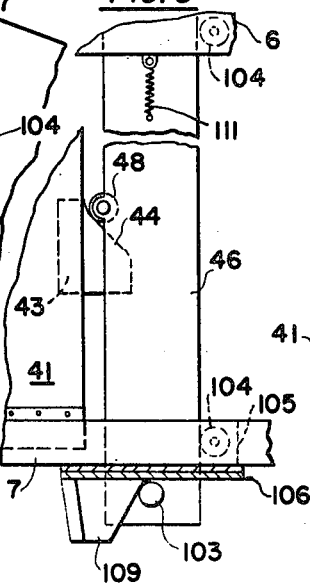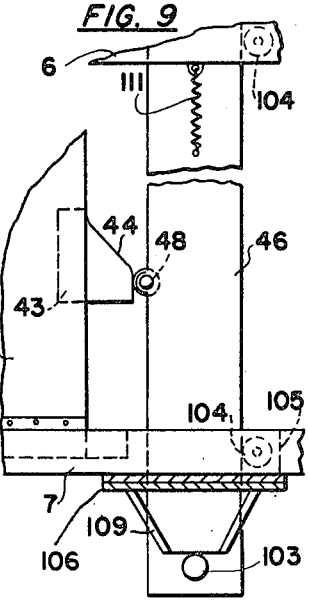

Oct. 9, 1956 J. GAUCI 2,765,815
APPARATUS FOR ASSEMBLING COIL SPRINGS INTO UNITS
Filed Feb. 14, 1951 6 Sheets-Sheet 5

INVENTOR
JOSEPH GAUCI

BY Semmes, Keegin, Robinson & Semmes
ATTORNEYS

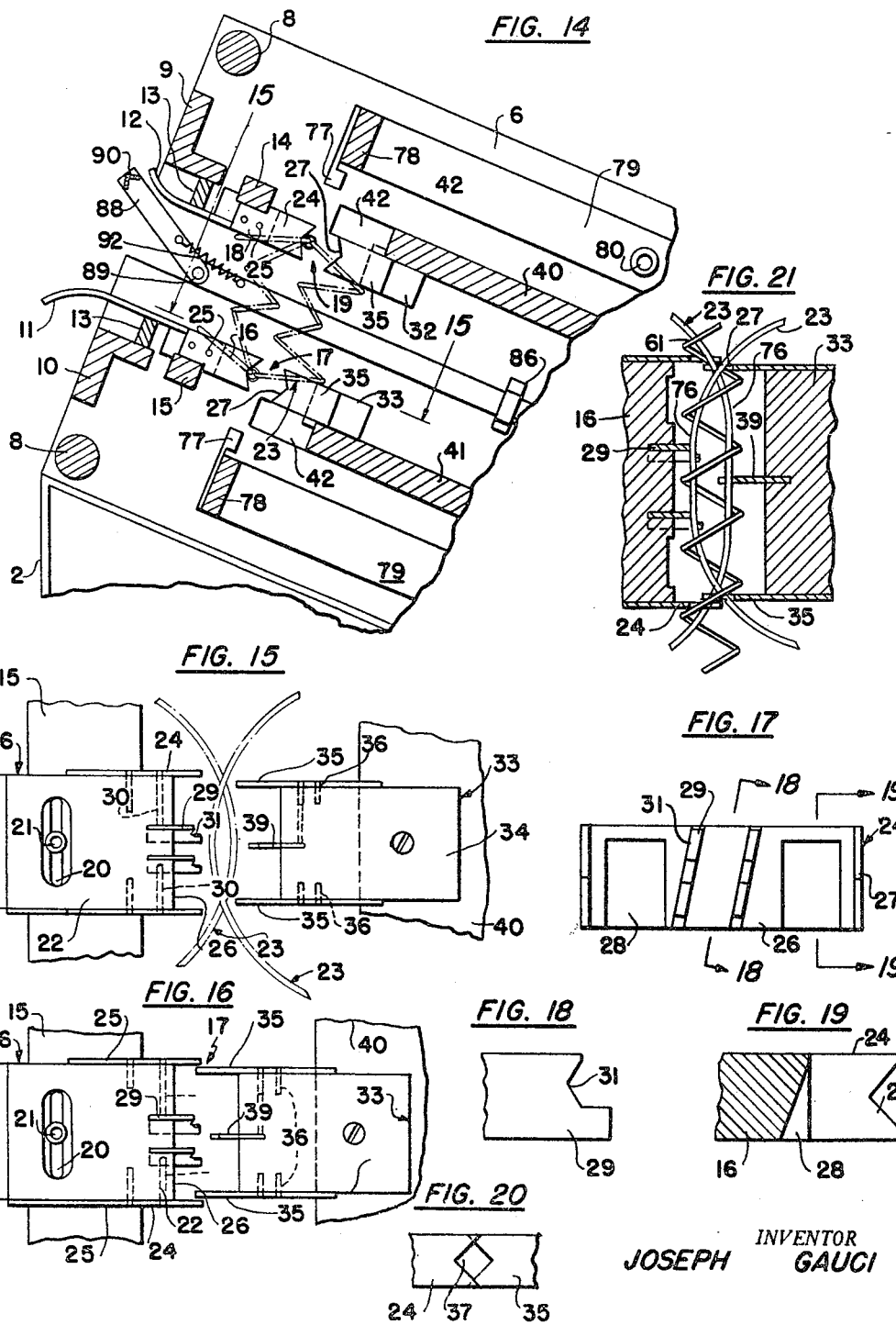

United States Patent Office 2,765,815
Patented Oct. 9, 1956

2,765,815

APPARATUS FOR ASSEMBLING COIL SPRINGS INTO UNITS

Joseph Gauci, Jersey City, N. J., assignor to Murray J. Rymland, Baltimore, Md.

Application February 14, 1951, Serial No. 210,928

5 Claims. (Cl. 140—92.94)

The present invention relates to apparatus for assembling coil springs into units of the type employed in the construction of mattresses, cushions and the like and has particular reference to an improved machine for assembling coil springs in successive rows and successively tying together the adjacent rows by feeding a helical wire around segments of the coils of adjacent springs which are overlapped and prepositioned by clamps into which such coils are placed. An improved means for feeding the helicals into encircling engagement with overlapped coil segments comprising the bottom and top loops of aligned springs in the adjacent rows of coils is more particularly claimed in my co-pending application Serial No. 210,927.

My present invention is particularly directed to apparatus for the assembly of coil springs into units, wherein individual adjacent coils are bound across the width of the unit by helicals emplaced to secure the top and bottom end loops of adjacent coils in slightly overlapped relationship, the longitudinal rows of coils being spaced as desired. The term "helical" refers to a helically wound length of wire consisting of a relatively high pitch small diameter wire helix. This binding member is referred to by the industry as a helical, and is emplaced on the coils by rotation about its axis, winding the helical into encircling engagement with the overlapped portions of the top and bottom loops of adjacent coils. This binding or tying procedure is carried out for each succeeding row of spring coils resulting in the assembly of a rectangular unit of spring coils.

In the coil encircling movement of the helical, considerable resistance to movement along its longitudinal axis has heretofore been encountered, necessitating a relatively positive drive mechanism for advancing the helical over the series of overlapped segments. It is desirable to provide mechanism for releasing the tied coils from their securing members after application of the helical thereto, as well as means for advancing the tied coils accurately the exact distance necessary for positioning of the next row of coils in the machine for the next helical connecting operation.

Due to the necessity for conducting a sequence of independent operations to position, tie and effect movement of the coils, prior mattress spring assembly machines have required, for example, manual insertion of the upper and lower helicals from opposite sides of the machine, lending to costly inefficiencies in use of labor.

It is an object of the present invention therefore to overcome disadvantages of the prior art machines for assembling inner spring units in which the coils are connected with helicals.

A further object is to provide a novel mechanism for clamping the coils of adjacent springs in proper overlapped position and so deforming the overlapped segments of such coils as to permit the helical to lace through such overlapped and deformed sections with a minimum of resistance to the helical during the lacing operation in which slip is reduced to a minimum, and wherein the convolutions of the helicals are engaged positively when the springs are released from the clamps.

A further object is to provide an apparatus for assembling coil springs embodying a novel mechanism for advancing tied coils an exact distance from the tying station permitting the insertion of the next series of coils in proper helical connecting position, in combination with means for releasing the tied coils from the mechanism for forward movement.

A further object is to provide an apparatus of the above character which may be readily and easily adjusted to accommodate varying numbers of coils in position for connection by means of a helical with a succeeding row of coils.

A further object is to provide a novel method for connecting coil springs into units for use in the construction of mattress springs and the like.

A further object is to provide a semi-automatic spring assembly machine wherein the operative parts are controlled from one side of the machine facilitating operation thereof.

Other objects and advantages of the invention will be apparent from the following detailed description thereof taken in connection with the drawings wherein:

Figure 3 is an end elevational view thereof;

Figure 4 is an end elevation taken from the opposite side of the machine from that shown in Figure 3;

Figure 5 is a vertical cross-sectional view taken along the line 5—5 of Figure 2;

Figure 6 is a similar view showing the pusher bar in operative position;

Figure 7 is a fragmentary view in enlarged vertical elevation showing the cam mechanism for operating the coil holding members;

Figure 8 is a fragmentary view in enlarged horizontal section of the actuating bars taken along the line 8—8 of Figure 7;

Figure 9 is a similar fragmentary view showing the actuating bar in a second operative position;

Figure 14 is a view in vertical cross section taken along the lines 14—14 of Figure 2;

Figure 15 is a detail plan view of the clamping jaws of the invention in open position taken along the line 15—15 of Figure 14;

Figure 16 is a similar view with the jaws in closed position;

Figure 17 is an end view of the fixed jaw;

Figure 18 is a sectional view taken along the line 18—18 of Figure 17;

Figure 19 is a sectional view taken along the line 19—19 of Figure 17;

Figure 20 is a fragmental end view of the coil positioning lugs on the clamping jaws in closed position; and Figure 21 is an enlarged view in the horizontal section showing the relative positioning of the coil loops when secured in the clamping jaws for application of the helical.

Figure 1:
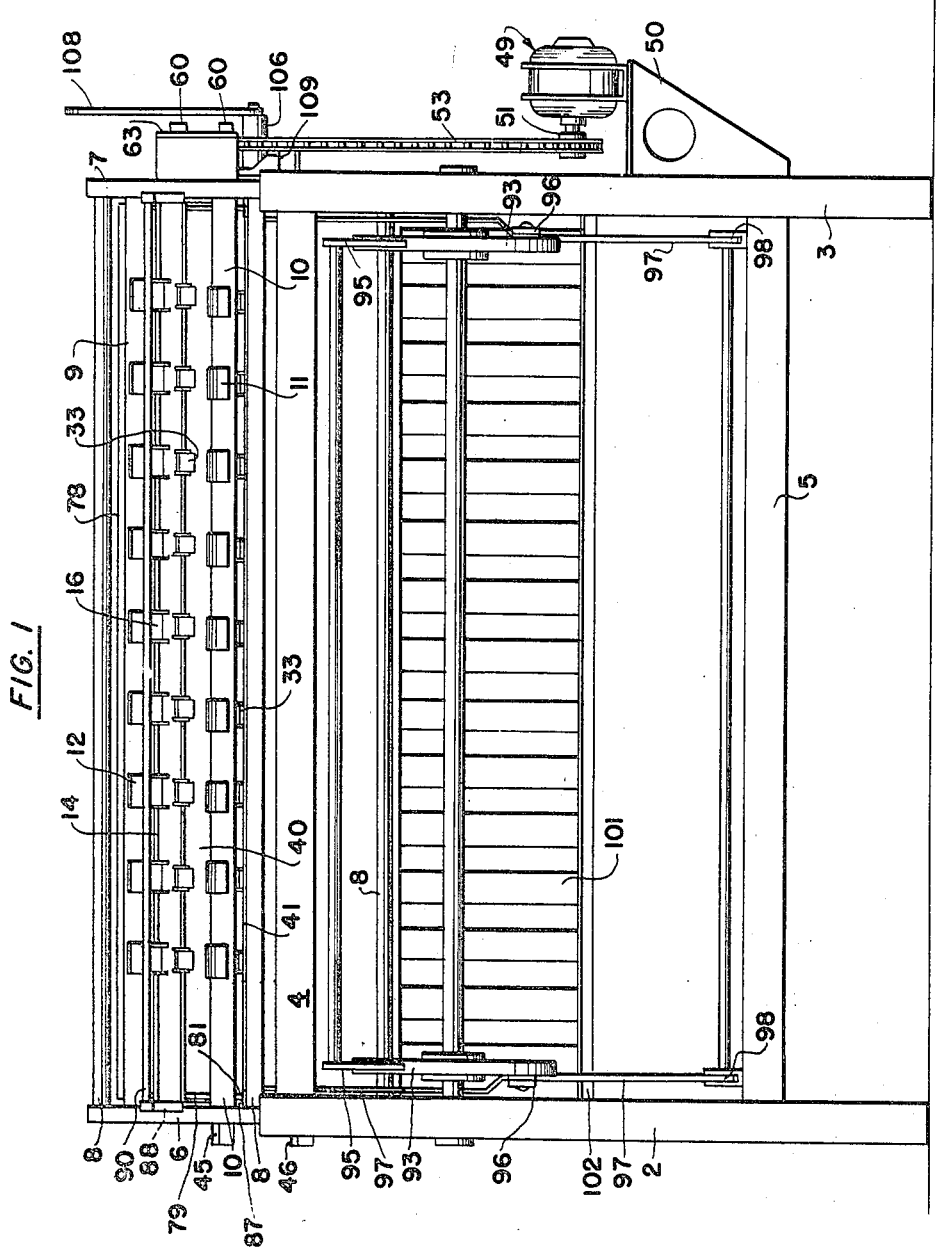
Figure 1 is a front elevational view of a machine embodying the invention.
Figure 2:
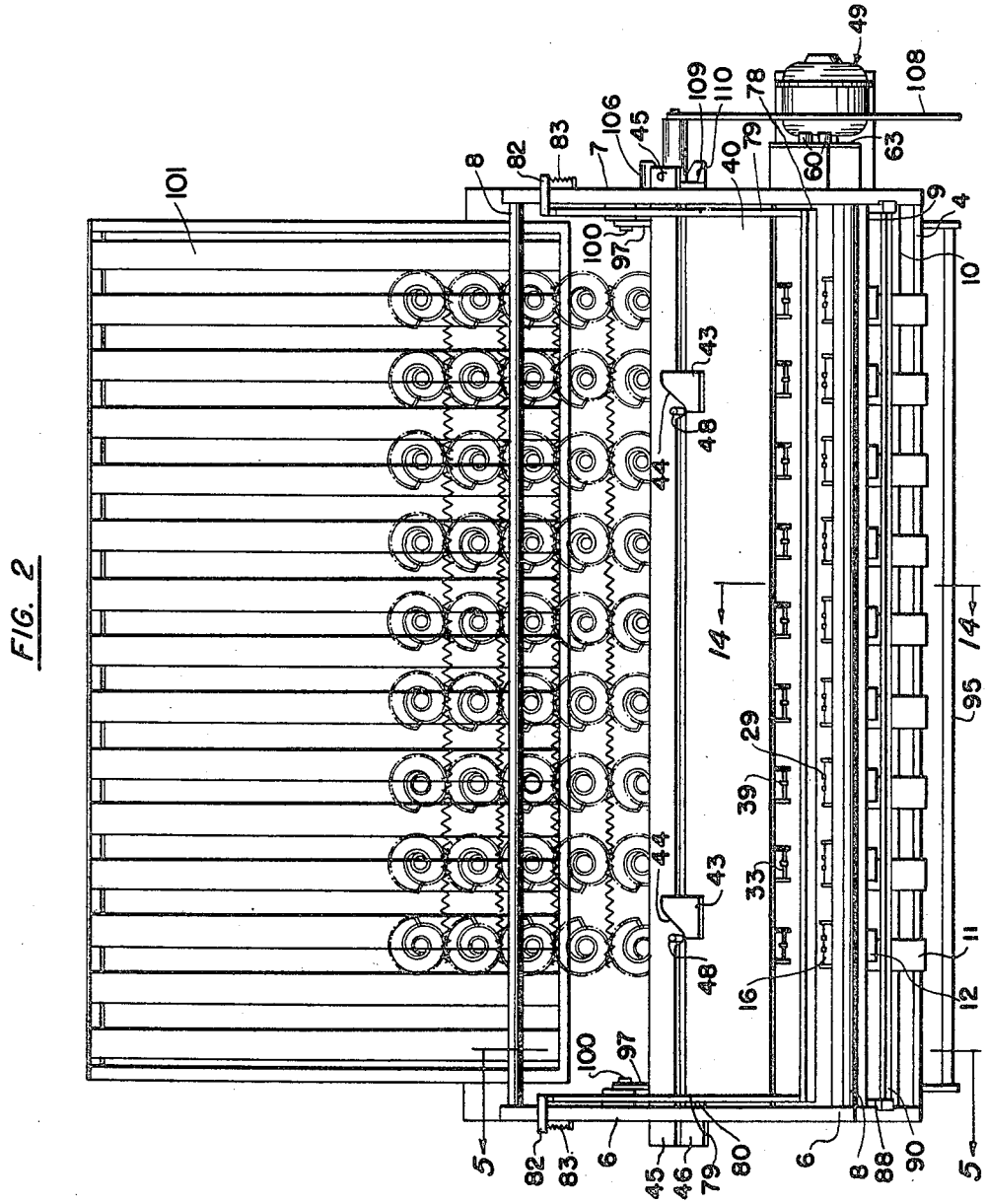
Figure 2 is a plan view thereof.

In its broadest application, the invention embodies novel apparatus and method for assembling coil springs into a unit of desired length and width for use as an inner spring for mattresses and the like, and includes the provision of clamps so designed as not only to bring the coils of the springs into position for engagement by a helical but also to apply sufficient pressure to deform that portion of the coils which are in engagement with the clamps in such manner as to permit the helical to lace through this portion of the coils without substantial friction and with a minimum of resistance being offered to the helical, and when the lacing operation or longitudinal travel of the helical is accomplished, a manual operation of the machine enables separation of the clamps, thus relieving the pressure originally applied to the coils. However, due to the original deformation of the coils by the clamps, that portion of the coils which overlap and are laced or held together by the helical, tend to spring out and to assume their original shape but are restricted from doing so by the interlaced helical. This novel feature produces an extremely tight fit of the coils within the helical which would not otherwise be possible but for the original pressure and deformation which resulted from the action of the clamps at the beginning of the cycle of operation. It will be understood that if the coils were not deformed in the clamps by a squeezing action so as to straighten the arc of the engaged coils, the inside diameter of a helical would of necessity have to be large enough to accommodate the coils in an undeformed condition. The action of the clamps therefore permits the use of a helical with an inside diameter less than that which would be required if the springs were not temporarily deformed, and it is this difference in the diameter of the helicals used which produce an extremely tight fit of the helical around the coils after the assembled unit is released from the clamps.

In my said machine, I provide means whereby simultaneously with the release of the pressure on the coils by the separating action of front and rear clamps which are located to engage the top and bottom coils of the springs, another action takes place which ejects the bottom section of the spring coils with the helical now attached thereto and the top section of the coil springs with the helical attached to clear the top face of the lower clamps and the bottom face of the upper clamps, so that the entire row can be moved rearwardly to the next position, thus leaving the front location vacant for the loading of a new row of springs.

Another feature of the clamp is that due to its novel construction which straightens the arc of coils being used, the size of the coils of the springs (that is the diameters of the coils at the top and bottom ends of such springs) do not have to be exact or similar as is required when used in prior art machines. In my machine, a variation of 1/4" plus or minus in the diameter of the coils being used does not adversely affect the action of the machine in lacing the helical member around the overlapping portions of the spring coils. This feature is particularly advantageous because preselection of spring coils is not required. Another advantage is, if a unit is to be made with spring coils of say $3^{15}/_{16}$ diameter and shortly after a change in production requirements make necessary the use of $4^{7}/_{16}$ dia. springs, I do not have to change clamps. I just merely loosen same and slide them along the holding bars so as to adjust for space between springs in a longitudinal direction only, no adjustment transversely being required. The assembled coils are moved through the machine in a downwardly inclined direction whereby the forces of gravity assist in the movement of the assembled springs through the machine giving the operator clear view of the work. Initially, the individual coils are inserted in the machine manually or otherwise in laterally spaced relation in a row across the machine equal to the width desired for the spring. These coils are displaced forwardly and a second set of coils inserted therein, the top and bottom loops of adjacent coils longitudinally of the machine overlapping, and a helical is emplaced thereon to tie the coils. The tied coils are advanced and the loading and tightening operations repeated. Novel means are provided for advancing tied coils and for driving the helical across the coils to join the overlapping segments or loops. A novel actuating mechanism is provided for operating spring clamping jaws and for releasing tied coils from the clamping jaws.

Referring now to Figures 1–4 of the drawings, the numeral 1 designates a frame of suitable strength and dimension embodying upright opposite side frames 2 and 3 joined by rearwardly inclined top plate 4, and a bottom reinforcing member 5. The "front" of the machine as referred to herein is that part into which the coils are fed by the operator for assembling, as shown in Figure 1. The term "rear" of the machine as used herein refers to the end from which the assembled spring unit discharges. The width of the frame 1 between the side frames 2 and 3 is shown as sufficient to assemble a unit of, for example, nine coils. It will be apparent from the following description that any portion of the width of the machine may be used in a particular assembling operation depending upon the width desired in the unit to be assembled. As shown in Figures 3 and 4, the top plate 4 is inclined downwardly from front to rear in the order of approximately 30°. The frame 1 carries vertical walls 6 and 7 on the side frames 2 and 3, forming supports for mechanism to be described.

The sidewalls 6 and 7 are rigidly braced by horizontal bars 8 at the corners. At the front end of the machine, two vertically spaced L-shaped members 9 and 10 extend horizontally between the sidewalls, defining an opening for insertion of spring coils into the machine. Each coil station is defined by a lower guide strip 11 and an upper guide strip 12, welded or otherwise secured to projections 13 formed on the members 9 and 10.

The fixed jaws

Extending between side frames 6 and 7 and rigidly secured thereto are a pair of horizontally extending parallel rails 14 and 15 with their transverse planes extending rearwardly and downwardly at an angle of about 30° with one aligned perpendicularly to the other, normal to this plane. A series of fixed jaws 16 is secured to the upper surface of the lower rail 15, the jaws 16 forming a part of a lower jaw assembly designated generally as 17. These fixed jaws are equally spaced apart laterally a distance equal to the desired lateral spacing of the coil springs in a spring unit, and may be provided in any number determined by standard width requirements for an inner spring.

A similar series of upper fixed jaws 18 forming a part of an upper jaw assembly designated generally as 19 is secured to the underface of horizontal rail 14, the upper fixed jaws being aligned with the lower jaws 16 and identical therewith except that they are in reverse position with respect thereto, the upper and lower fixed jaws being in horizontal extension of their respective guide strips 11 and 12 to receive and position a coil spring in a tying station.

Each of the jaws 16 and 18 are formed with a slot 20 receiving a set screw 21 for adjustably locking the jaws to their respective support rails 14 and 15 (Figure 15).

Each fixed jaw is in the form of a rectangular plate having an unbroken coil supporting surface 22 for receiving and positioning the top and bottom helix or loop of a coil spring, for a tying operation, shown in dotted line as 23 in Figure 15. Each jaw 16 is provided with arms 24 secured by screws 25 to either side of the jaw, the arms extending beyond the face 26 of the jaw 16. Each arm 24 is provided with a V-shaped cut 27 which serves to position and secure the wire of a coil segment in tying position. The jaw face 26 is cut back as at 28 at a point just inside each arm 24 to provide clearance for the coil segment, serving a purpose to be described. Centrally of the jaw face 26 are positioned two loop positioning members 29, set into slots formed in the jaw face and secured therein by set screws 30 shown in dotted line in Figure 15. The members 29 are spaced laterally of the jaw face and set at a slight angle to a line normal to the horizontal plane of the jaw 16. The ends of the members 29 are cut away at the upper corners 31 as shown in Figure 18 for loop positioning purposes, the cut 31 preferably being formed with walls angled hexagonally, and the bottom of the cut extending outward to prevent the coil from dropping downward between the jaw. The V-shaped portions 27 of the arms 24 and the cuts 31 of the members 29 are so positioned as to cooperate in guiding a helical through the fixed and movable jaws over the coil segments, in a manner to be described.

The movable jaws

Each fixed jaw 16 is matched with a cooperating movable jaw, there being upper and lower movable jaws 32 and 33 completing the jaw clamp assemblies 17 and 19. Each movable jaw comprises a flat rectangular plate 34 provided with arms 35 secured by set screws 36 to opposite edges of the plate, the arms 35 also having the V-shaped end 27 shown in Figure 19 and being so proportioned as to fit snugly inside the arms 24 of the fixed jaw 16 as shown in Figure 16, when the jaws are in closed position. As shown best in Figure 20, when the arms 24 and 35 overlap in closed position, the V-shaped cuts 27 define an aperture 37 for receiving the binding helical. Each movable jaw 32 and 33 is provided on its forward edge 38 with a single vertical coil segment positioning member 39, the member 39 fitting between the members 29 when the fixed and movable jaws are brought together as in Figure 16.

The upper and lower movable jaws are welded or otherwise secured to upper and lower support plates 40 and 41 extending between the vertical sidewalls 6 and 7 of the frame, the latter being slotted at 42 to receive the opposite ends of the plates 40 and 41 for sliding movement in the plane of the rails 14 and 15 supporting the fixed jaws. The plates 40 and 41 are provided with extensions 43 having cam surfaces 44. Each upper and lower movable jaw 32 and 33 is provided with actuating rails 45 and 46 mounted in slots 47 formed in the sidewalls 6 and 7 of the frame for movement normal to the plane of movement of the movable jaws 32 and 33. Each actuating rail is provided with a pin 48 resting in engagement with the cam surface 44 of the extension 43, whereby lateral movement of the actuating rail in one direction causes pin 48 to ride the cam surface 44 forcing the movable jaw support plate toward the front end of the machine (Figure 9) closing the jaw assembly. Reverse movement of the actuating rails 45 and 46 moves the pin 48 to the position shown in Figure 8, freeing the support plate 41 for gravitational movement rearwardly to open the jaw clamp assemblies 17 and 19. Movement of the actuating rails is accomplished by cam mechanism to be described.

A fixed jaw and a movable jaw as hereinabove described comprises a clamp which holds a set of overlapping springs and consists of a front clamping jaw and a rear clamping jaw, one clamp being required for the bottom of the overlapping spring set and another for the top of the spring set. The movable clamping jaw has three extensions, two of which are located at the extreme sides thereof and one at the center or middle of the jaw. These extensions project beyond the working edge of the clamp and are arranged in a line which engages the arc of the coil of the spring being contained and which is to be subjected to a pressure as a result of the movement of said movable clamping jaw towards its opposing relatively stationary clamping jaw. The relatively stationary upper front clamping jaw and the lower rear clamping jaw are identical and each has four projections, two of which are on the extreme sides of the clamping jaw and two projections between such side projections and which are arranged to straddle the transverse center line of the jaw. These projections of the relatively stationary jaw are adapted to straddle the projections on the opposing clamping jaws and are adapted when brought together to cause the radii of the arcs of the overlapping sections of the spring to be increased to such an extent that such overlapping arcs between the sides of the clamping jaws assume lines which are almost a straight line as a result of the clamping jaws being brought together by the action of a cam, the function of which is to bring the clamping jaws together. This changing of the radii of the arcs of the engaged spring coils permits the lacing of the helical around such nearly straight portions without encountering any appreciable degree of resistance. Now, should the clamping jaws be required to move towards one another to a greater degree in order to accommodate a larger or smaller spring, this adjustment can be obtained by permitting the cam to travel a greater or lesser distance by the adjustment provided for such travel and which is located on the frame of the machine and acts as a stop limiting the travel of the handle which actuates the cam.

Due to the construction of the clamping jaws, with said four separated projections on one clamping jaw and three separated projections on the other clamping jaw, the springs in the overlapped position and the helical in its laced position around the coils are unobstructed to the view of the operator.

In order to adjust the distance between the center lines of the springs in a longitudinal line all that is required is to loosen the screws which project through the elongated slots of the clamps and are threaded into the clamping-jaw holders and then move the clamping jaws longitudinally, until the desired center line distance of the spring is reached and the coincidence of the pitch of the helical with the arcs of the spring is attained. This is an extremely simple adjustment and all of the conditions to be met are unobstructed from the view of the operator.

In the event of wear as a result of prolonged use of the projections of the clamping jaws, it is a simple and inexpensive matter to replace the projections, as they are attached to the clamping jaws by means of set screws. In other words, the clamping jaws themselves, as distinguished from the projections, are not subjected to any wear during the operation of the machine, and the clamps, as a whole, are extremely inexpensive as compared with spring holders or clamps described in prior art patents.

The machine, as a whole, is light in weight and inexpensive to manufacture as compared with prior art machines and due to the design of the clamping jaws and the simple technique required to actuate these clamping jaws, another advantage resulting from the design of the clamping jaws is that only one operator is required to set in motion all the functions of the machine.

The helical drive

The helicals are fed across the upper and lower jaw clamp assemblies by grooved feed wheels which engage the helical tangentially and parallel with the helix angle to rotate the helical about its axis. The helical is simultaneously forwarded, one lead each revolution of the helical, over the overlapped end loops of the adjacent coils. The arms on the opposed faces of the fixed and movable jaws form guide channels for the helical, as well as securing the overlapped segments of the coils in helical applying position.

The helicals are introduced into the guide channels defined by the cooperating jaw arms and the segment positioning members from one side of the machine, facilitating the work of the operator. A novel drive for advancing the helicals is provided, being shown in Figures 10–13. A source of power such as electric motor 49 is carried on a platform 50 mounted on the frame cross bar 5. A driving pulley 51 supplies power to a driven pulley 52 through drive chain 53, the driven pulley 52 being mounted on shaft 54 rotatably journalled in the side wall 7. Shaft 54 also carries a driving pulley 55.

Figure 10:
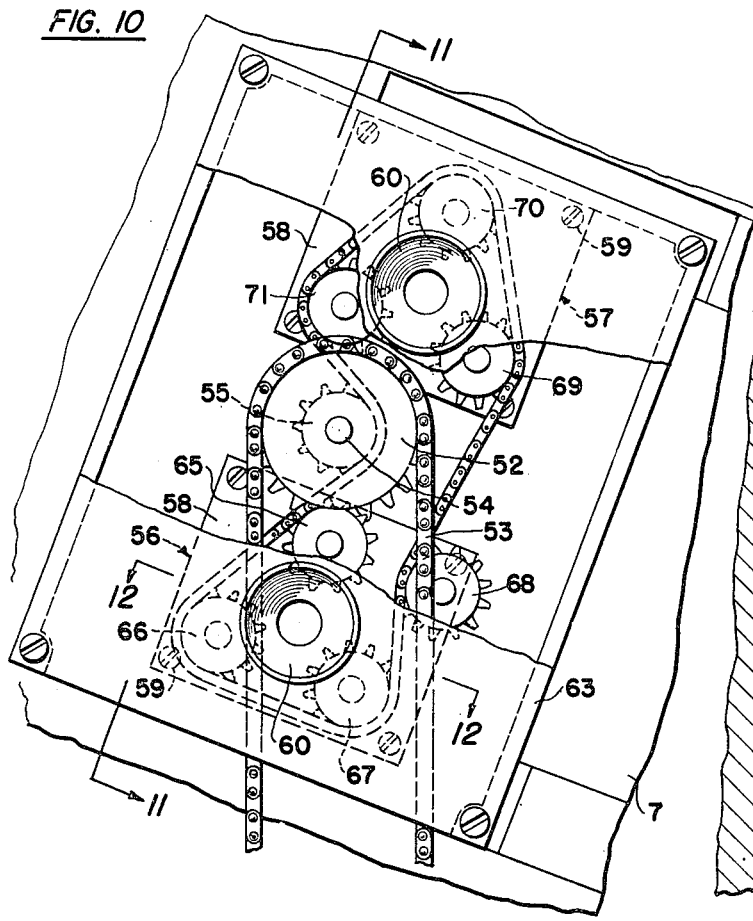
Figure 10 is a view in side elevation, partly broken away, of the drive means of the invention.
Figure 11:
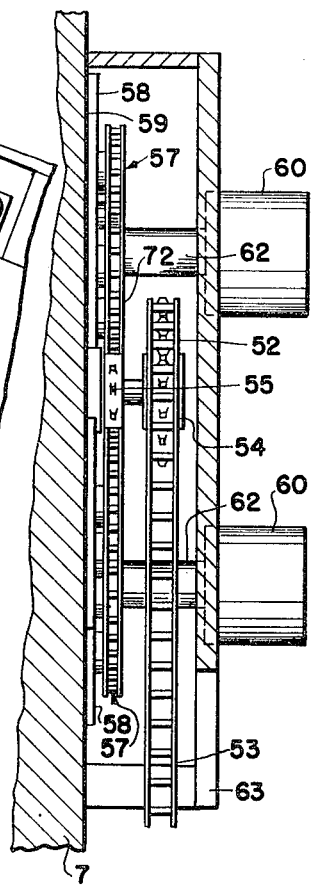
Figure 11 is a view taken along the line 11—11 of Figure 10.
Figure 12:
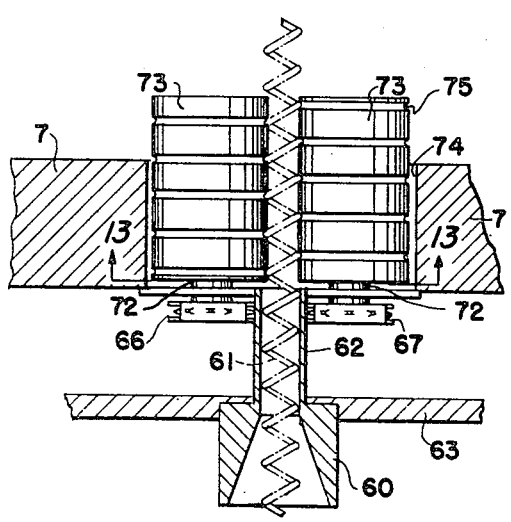
Figure 12 is a detail horizontal sectional view taken along the line 12—12 of Figure 10.

As shown in Figure 10, upper and lower helical drive assemblies 56 and 57 are provided, one for each jaw clamp assembly 19 and 17, each assembly being supported on a plate 58 secured to the side wall 7 by screws 59. Each drive assembly comprises a cone shaped member 60 for guiding a helical 61 into a feeding tube 62, the same being fixedly mounted on a guard plate 63 which encloses the entire drive mechanism.

Figure 13:
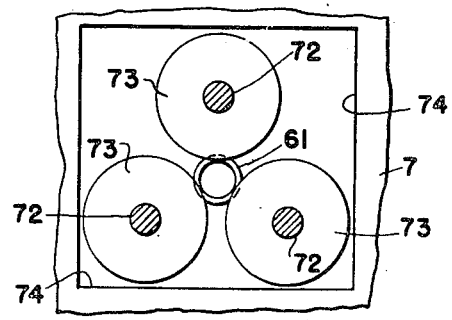
Figure 13 is a fragmental elevational view of a detail of the power drive.

The driving gear 55 on shaft 54 engages with a chain drive 64 which carries power to both drive assemblies 56 and 57, engaging with driven gears 65, 66 and 67 on drive assembly 56, passing over idler 68 to driven gears 69, 70 and 71 of drive assembly 57. Each driven gear is carried on an identical shaft 72 journalled rotatably in each plate 58, the other end of shaft 72 carrying identical helical drive rollers 73, three for each drive assembly and positioned as shown in Figure 13 to receive the helical 61. It will be noted that the frame 7 is cut out at 74 behind the plates 56 and 57 to receive the drive rollers 73. The face of each roller 73 is grooved at 75 to receive convolutions of the helical 61. Thus, the convolutions of the helical 61 are engaged by the grooves 75 of each roller 73 which upon rotation track the convolutions, rotating the helical about its axis and simultaneously advancing the helical on its longitudinal axis. As the helical is positively engaged on three sides as shown in Figure 13, a positive helical drive is accomplished, eliminating the danger of the helical jumping away from the drive mechanism when an obstruction to longitudinal movement is encountered, and minimizing slippage between the helical 61 and the grooves 75.

As shown in exaggerated detail in Figure 21, when the fixed and movable jaws 16 and 33 are moved to clamping position upon the overlapping segments or loops 76 of the coils designated as 23, the loops 76 are forced together by positioning members 29 and 39, temporarily deforming the loops to receive the helical 61. As the helical 61 is advanced by the drive rollers 73, the free end of the rotating helical will seek the aperture 37 defined by the members 24 and 35 to enter the clamping jaws, and the helical will then "wind" itself around the overlapped loops 76, the free end of the helical travelling between the members 29 and 39 to seek the aperture 37 defined by the members 24 and 35 opposite the point of entry of the helical.

The relative absence of friction encountered by the helical as it laces the overlapping parts of the springs permits for an extremely rapid advance of the helical which reduces the time required to assemble a mattress innerspring unit, and it further reduces the possibility of a windup of the helical which alters the pitch of the helical and presents a difficult condition with which to contend.

Movement of the coils

Means are provided for movement of tied coils out of the jaw assemblies making room for insertion of a new series of coils in operative position between the upper and lower fixed jaws. After the loops of the coils have been joined by the helicals, means are provided for raising the joined coils free of the jaw assemblies, as the jaws are moved apart. Said means comprise pins 77 mounted for vertical movement, a pair of opposed pins 77 being provided for each jaw assembly and mounted on horizontal rails 78 extending across the machine (Figure 14). The free ends of the opposed pins 77 normally rest under the fixed jaws 16 and 18, swinging inwardly towards each other into a position between each fixed and movable jaw as the jaws are opened, into engagement with the segments 76 of the tied coils 23 to move the joined upper and lower loops of the coils inwardly towards each other, compressing the coils out of the V-shaped notches 27 on opposed arms 24 and 35.

The upper and lower horizontal bars 78 are carried by identical upper and lower levers 79 pivoted on the frame at 80 for rocking movement on the pivot to raise and lower the pins 77. The free ends of levers 79 are provided with end members 81 for actuation of the levers, in a manner to be described. Stop members 82 rest on the top edges of the side walls 6 and 7, being tensioned thereon by springs 83, thereby holding the pins 77 in inoperative position.

The inner surface of each side wall 67 is slotted at 84 in a plane parallel to the jaw assemblies, the slots extending along the length of each side wall from front to rear to receive a sliding rail 85. The rails 85 are supported for movement in their respective slots by guide brackets 86. Each rail carries upper and lower projections 87 for engagement with the end members 81 of the levers 79, to rock the levers on their pivots 80. The front end of each rail 85 carries an extension 88 pivotally mounted thereon at 89, the extension supporting a horizontally disposed rail forming a coil pusher bar 90. As shown in Figure 6, each slot 84 is cut out at 91 to provide a recess receiving the rail extension 88 as shown in Figure 5, lifting the pusher bar 90 out of the path of coil springs to be inserted in the machine. A spring 92 tensions each extension 88 to snap upwardly into the recess when the rails 85 are advanced forwardly to the position shown in Figure 5.

Movement of the rail 85 is accomplished by means of a hand wheel 93 rotatably mounted on a frame member 94 and having a handle 95. A link 96 extends between a point on the wheel periphery to a lever 97 pivotally mounted on the frame at 98 for rocking movement. The upper end of lever 97 carries a link 99 riding on a pin 100 mounted on the rail 85. It will be seen that actuation of the wheel 93 will ride rails 85 in their respective slots, between the two extreme positions shown in Figures 5 and 6.

As pusher bar 90 is moved rearwardly, the extensions 88 ride on the surface of their respective recesses 91 bringing the extensions into longitudinal alignment with the rail 85, whereupon the pusher bar 90 is brought into engagement with the tied coils for movement rearwardly from the jaw clamp assemblies. The length of stroke of the rails 85 is determined in accordance with the desired distance of rearward movement of the tied coils. Just prior to the coil displacement operation, it will be observed that the projections 87 lift the end members 81 of levers 79 to bring pins 77 into compressing contact with the tied coils, freeing the coil from the jaw assemblies. Thus the tied coils are moved in successive stages through the machine. As shown in Figures 1 and 3, the tied coils are moved onto delivery ramps 101 which extend from the rear of the machine, being supported by bars 102, whereby the assemblied unit slides downwardly and rearwardly from the machine in full view of the operator, movement being assisted by gravity.

The actuating bars

Means are provided for operating the upper and lower actuating bars 45 and 46 simultaneously to effect movement of the movable jaws 32 and 33. Referring to Figures 7 through 9, each actuating bar is provided with a roller 103 on the end thereof which extends outwardly beyond the frame 7. Friction rollers 104 are fitted within slots 105 in the frame 7, to assist in movement of the actuating bars. A wheel 106 is rotatably mounted on the frame 7 on stub shaft 107, being provided with an operating handle 108 for actuation thereof. The wheel 106 is provided with opposed raised cam surfaces 109 for engagement with the opposed rollers 103 on the upper and lower actuating bars 45 and 46, drawing the bars simultaneously to the position shown in Figure 6. In this way, the plate 41 supporting the movable jaws is forced to closed jaw position by interaction of cam surface 44 and pin 48. Inclined surfaces 110 are formed at either side of raised surface 109 to release gradually roller 103 as the wheel 106 is rotated to displace surface 109 from the roller. Resilient means such as a spring 111 extend between each actuating bar and the frame side wall 6, tensioned to return the actuating bars to the position shown in Figure 8, whereby the plate 41 slides rearwardly under its own weight to open the jaw assemblies. The lever 97 for actuation of the bar 85, may also be tensioned with a spring 112 secured at one end to the frame post 3, whereby the sliding bar normally is positioned as shown in Figure 5.

In operation, with the machine free of coils, it is necessary for the operator to load the machine initially with a set of coils equal in number to the desired width of the spring, and to move the first set of coils with the pusher bar 90 to the advanced position shown in Figure 14. A second set of coils is then emplaced on the fixed jaws.

(1) Now, pull lever which brings clamp jaws together;

(2) Feed one helical through the driving head to engagement with the top of the row of springs; feed another helical to the bottom of the row of springs through the driving head. (This provides a border of helical wire to the top and bottom of the first row of springs);

(3) Pull lever 108 which opens the clamps relieving all pressure;

(4) Press down lever 95 which simultaneously ejects springs from top and lower clamps and advances the entire row (which now has a border of helical) to the exact position where the rear clamps are. By releasing the same lever the row of springs will drop into the rear row of clamps. The front row of clamps is now vacant and ready for loading. Repeating of the foregoing operations will produce a unit of springs of suitable length.

It will be noted that there are only two levers employed which are located so that one person only is required for operation of the machine and only a minimum of operations are necessary.

The helicals are then driven through the apertures defined by the upper and lower jaw assemblies simultaneously to warp a helical around the upper loops of successive coils in a row across the assembled spring and another helical around the lower loops of successive coils in a row across the spring. Ordinarily one coil will be engaged by four turns of the helical and the other coil by five turns, as shown in Figure 21, to give an unusually strong spring assembly. After the helicals have been driven across the machine, the handle 108 is pivoted to turn wheel 106 and move actuating bars 45 and 46 to open the jaws. Then the wheel 93 is turned to compress the coils by means of pins 77 and actuate pusher bar 90 to displace the coils and make room for the insertion of a new row of coils.

It will be noted that in my machine all jaws are movable. The rear jaws are moved as a unit transversely towards and to the front jaws as a unit by virtue of being attached to a common holder for the bottom row and a common holder for the top row. However, they are adjustably movable longitudinally and independent of each other in this direction. This is accomplished by elongating the slot in the clamp through which a bolt is placed and screwed or threaded into the holder bar. Said holder bar has a series of threaded holes throughout its entire length and these holes are spaced apart at such increments so that their spacing together with the movement allowed of the clamp by the elongated slot gives a fine adjustment between the limits of adjacent clamps or one clamp on one side and the end of the machine on the other side. The front clamps, both top and lower, are not movable transversely because they are secured to a holder bar. However, the front clamps are adjustably movable as described above for the rear clamps.

While the invention has been described in specific detail, it is to be understood that many instances of reversal of parts will occur to one skilled in the art, as well as substitution of equivalent mechanisms. It is intended that all such modifications be included within the scope of the appended claims.

I claim:

1. An apparatus for assembling coil springs comprising a frame, spaced vertical sidewalls on the frame each having slots therein, parallel vertically spaced upper and lower rails extending between and fixedly secured to the sidewalls, fixed jaws secured to the aligned surfaces of the rails in opposed pairs, a second pair of parallel vertically spaced rails with ends supported in the slots for relative movement with respect to the fixed rails, upper and lower movable jaws mounted in aligned pairs on the sliding rails, a cam surface on each sliding rail, an actuating bar extending in parallel relation and connected to each sliding rail to move the movable jaws, each said actuating bar having a pin for engaging the cam surface to move the sliding rails to closed jaw position, and manual means for reciprocating the actuating bars to close the upper and lower pairs of jaws.

2. An apparatus for assembling coil springs into an inner spring unit comprising upper and lower jaw assemblies each including a fixed jaw and a movable jaw movable to a closed position relative to the fixed jaw, means on the jaws for positioning and securing loops of adjacent coils in a tying position, means for actuating the movable jaws, coil compressing means for releasing tied coils from the jaw assemblies when in open position, a pusher bar for removing tied coils from the area of the jaw assemblies, and a linkage for actuating the pusher bar, said linkage including a cam surface engaging with the coil compressing mechanism to actuate same when the pusher bar is actuated.

3. An apparatus for assembling coil springs comprising a frame, spaced vertical sidewalls on the frame each having slots therein, parallel vertically spaced upper and lower rails extending between and fixedly secured to the sidewalls, fixed jaws secured to the aligned surfaces of the rails in opposed pairs, a second pair of parallel vertically spaced rails with ends supported in the slots for relative movement with respect to the fixed rails, upper and lower movable jaws mounted in aligned pairs on the sliding rails, a cam surface on each sliding rail, an actuating bar extending in parallel relation and connected to each sliding rail to move the movable jaws, each said actuating bar having a pin for engaging the cam surface to move the sliding rails to closed jaw position, and manual means for reciprocating the actuating bars to close the upper and lower pairs of jaws, said means for reciprocating the actuating bars comprising a wheel journalled on the frame, and opposed cam surfaces on the wheel engaging the actuating bars upon rotation of the wheel to move the sliding rails.

4. In an apparatus for assembling coil springs having a frame, spaced vertical sidewalls on the frame, upper and lower jaw assemblies supported by the sidewalls for securing loops of adjacent coils, a device for removing tied coils from between the jaw assemblies comprising a pair of rails, each sidewall being slotted forming a track for each rail, extensions on the ends of the rails pivotally connected thereto, a pusher bar supported by the extensions, each sidewall track having a cut out portion, springs normally positioning the extensions and pusher bar in inoperative position out of the area of the jaw assemblies, and means for sliding the rails in the tracks to draw the pusher bar extensions out of the cut out portion into operative position in the area of the jaw assemblies to remove tied coils therefrom.

5. An apparatus for assembling coil springs into an inner spring unit comprising upper and lower jaw assemblies each including a fixed jaw and a movable jaw movable to a closed position relative to the fixed jaw, means on the jaws for positioning and securing loops of adjacent coils in a tying position, means for actuating the movable jaws, coil-compressing means for releasing tied coils from the jaw assemblies when in open position, a pusher bar for removing tied coils from the area of the jaw assemblies, and a linkage for actuating the pusher bar, said linkage including a cam surface engaging with the coil-compressing mechanism to actuate same when the pusher bar is actuated, the said coil-compressing means comprising pairs of upper and lower levers, a bar connecting the ends of the levers of each pair, means on each bar positioned behind each jaw assembly to engage the adjacent ends of the tied coils, tension members normally retaining the levers and bars in inoperative position and surfaces on the ends of the levers removed from the bar for engagement by the cam surface on the linkage for actuating the pusher bar.

References Cited in the file of this patent

UNITED STATES PATENTS

| Number | Name | Date |
|---|---|---|
| 1,907,323 | Kirchner | May 2, 1933 |
| 1,922,002 | Karr | Aug. 8, 1933 |
| 2,012,904 | Bowersox | Aug. 27, 1935 |
| 2,176,262 | Kirchner | Oct. 17, 1939 |
| 2,231,744 | Zimmerman | Feb. 11, 1941 |
| 2,262,994 | Dickey | Nov. 18, 1941 |
| 2,275,209 | Turgeon | Mar. 3, 1942 |
| 2,282,664 | Marcus | May 12, 1942 |
| 2,286,326 | Zimmerman | June 16, 1942 |
| 2,388,106 | Woller | Oct. 30, 1945 |
| 2,420,512 | Woller | May 13, 1947 |
| 2,470,812 | Gauci | May 24, 1949 |